United States Patent

[11] 3,591,778

[72] Inventor  Roger L. Barron
     Burke, Va.
[21] Appl. No. 759,870
[22] Filed     Sept. 16, 1968
[45] Patented  July 6, 1971
[73] Assignee  Adaptronics, Inc.
     McLean, Va.

[54] SELF-ORGANIZING CONTROL SYSTEM WITH CONSTRAINED PERFORMANCE ASSESSMENT
     14 Claims, 4 Drawing Figs.

[52] U.S. Cl. .................................................. 235/150.1,
                                                     340/172.5
[51] Int. Cl. ...................................................... G05b 13/02
[50] Field of Search ........................................... 340/172.55;
                                                     235/150.1

[56] References Cited
     UNITED STATES PATENTS
     3,109,970  11/1963  Smyth .......................... 235/150.1 (X)
     3,460,096  8/1969   Barron ......................... 340/172.5

Primary Examiner—Eugene G. Botz
Attorney—Jay M. Cantor

ABSTRACT: The disclosure relates to a self-organizing control system having performance assessment circuitry responsive to each command signal, capable of providing an error performance term which is a summation of the signals provided by each of the performance assessment circuits. The system also includes constraint circuitry, there being one constraint circuit corresponding to each actuator excitation signal, the constraint circuit outputs being summed and subtracted from the summation of the performance assessment circuitry outputs to provide a single value signal. The single value signal is utilized to control all of the actuation correlation logic circuits which, in turn, can control the individual actuators or parameters in the plant. The constraint circuits are utilized to prevent the system from correcting too rapidly in predetermined areas relative to other predetermined areas and the like, or to constrain the expenditure of control excitation resources.

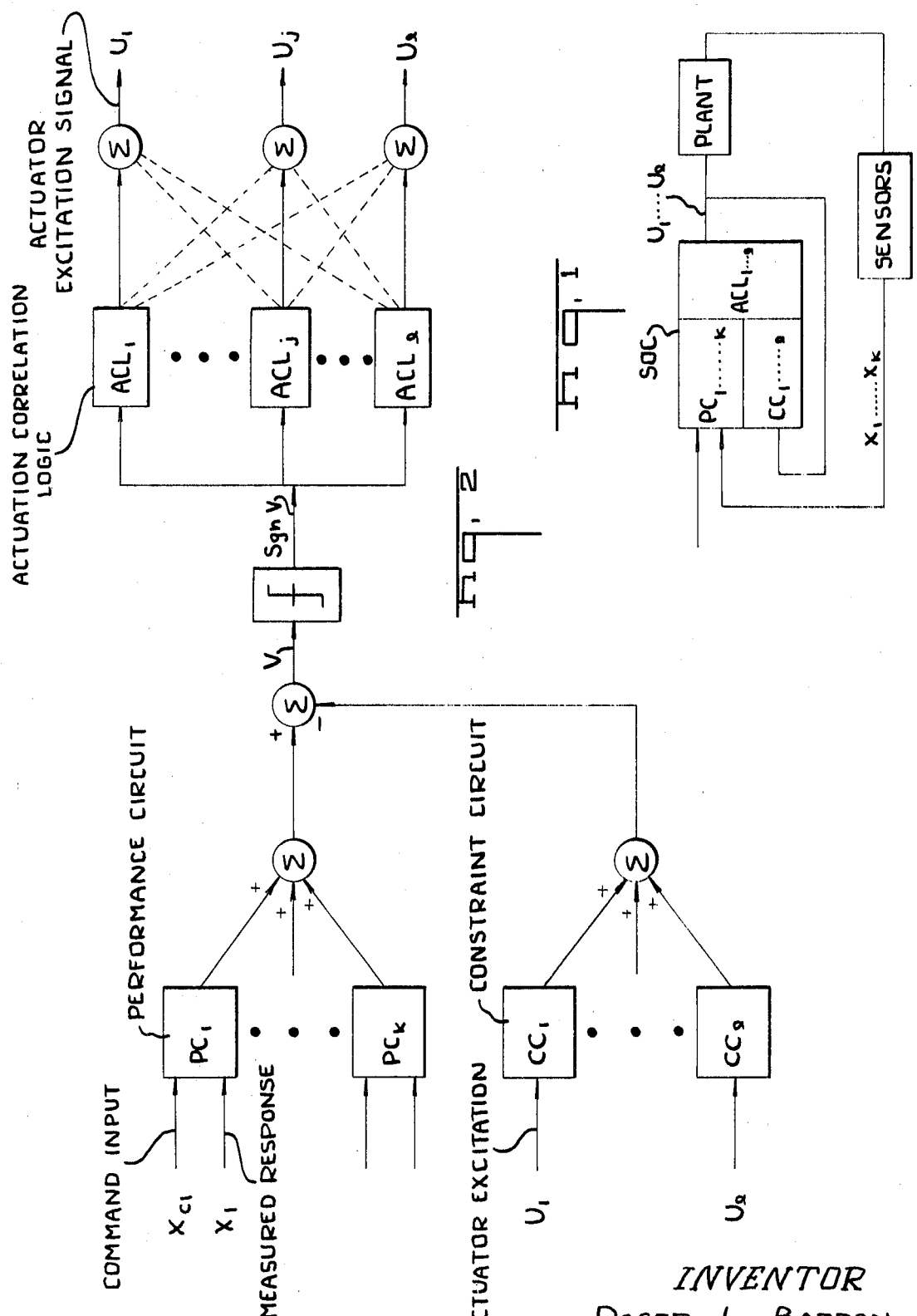

SELF-ORGANIZING CONTROL SYSTEM WITH CONSTRAINED PERFORMANCE ASSESSMENT

The invention relates to a self-organizing control system having constrained performance assessment and, more specifically, to a self-organizing control system capable of providing a single value signal for controlling a plurality of actuation-correlation logic circuits, the value signal being derived by the subtraction of a summation of plural constraint terms provided by constraint circuits from the summation of error performance terms provided by plural performance assessment circuits.

Self-organizing control systems are known to the art. An example of such a control system is fully set forth in an article entitled "Self-Organizing Controllers" by Roger L. Barron, *Control Engineering*, Feb. and Mar., 1968. In self-organizing control systems of this type, there is provided a self-organizing control system capable of providing online operation and also capable of providing simultaneous influence on each actuator of multiple system error signals is identified and a self-organizing controller compensates for changing polarities of actuator direct and cross-coupled effects.

Systems of the above-identified type, while operating with great success, have tended to improve system performance by randomly improving each of the parameter values or actuator performance of the system. This type of operation can often cause undesirable problems in that, for example, certain ones of the parameters will be corrected more rapidly than others, relatively speaking, and thereby involve undue losses as, for example, use of greater quantities of fuel than is required, thereby providing unnecessary fuel consumption as opposed to other possible ways of improving system performance which may be as rapid or almost as rapid and more efficient.

The purpose of this invention is to introduce the technique of constraining the use of physical resources in achieving the desired error performance of the control system. Practically, most control applications have a physical constraint on the use of control resources. It is important in the use of self-organizing control systems to be able to embody such a requirement in the performance assessment synthesis, and this is provided by the present invention, which proceeds from an integral performance criterion having both the error performance requirements and the constraint requirements embodied.

Briefly, the above is accomplished by utilizing a self-organizing control system capable of producing actuator excitation signals to control the plant and obtain measured response variables indicative of plant operation. The self-organizing control system utilizes command input signals in conjunction with the measured response variables to provide error signals for driving each of the performance circuits and also provides a plurality of constraint circuits responsive to the actuator excitation signals whereby the summation of the outputs of the performance circuits has subtracted from it the summation of the outputs of the constraint circuits to provide a single system performance or value term. The single value term is then utilized to control each of the actuation-correlation logic circuits of the system, there being one such actuation-correlation logic circuit corresponding to each of the parameters at the plant to be operated upon. In this manner, by proper selection of constraint circuit coefficients, a constraint can be provided on the amount of the actuation signal supplied for each of the parameters controlled by such actuator excitation signals.

It is therefore an object of this invention to provide a self-organizing control system having constrained performance assessment capable of controlling actuator excitation on an actuator by actuator basis.

It is a further object of this invention to provide a self-organizing control system utilizing a constrained performance assessment circuit which provides a single value signal for controlling a plurality of actuation-correlation logic circuits.

It is a still further object of this invention to provide a constraint circuit capable of operating in conjunction with a performance assessment circuit to provide constrained performance assessment.

The above objects and still further objects of the invention will immediately become apparent to those skilled in the art after consideration of the following preferred embodiment of the invention which is provided by way of example and not by way of limitation wherein:

FIG. 1 is a block diagram of a self-organizing control system with constrained performance assessment in accordance with the present invention;

FIG. 2 is an expanded block diagram of the self-organizing control circuit of the present invention;

Figure 3:
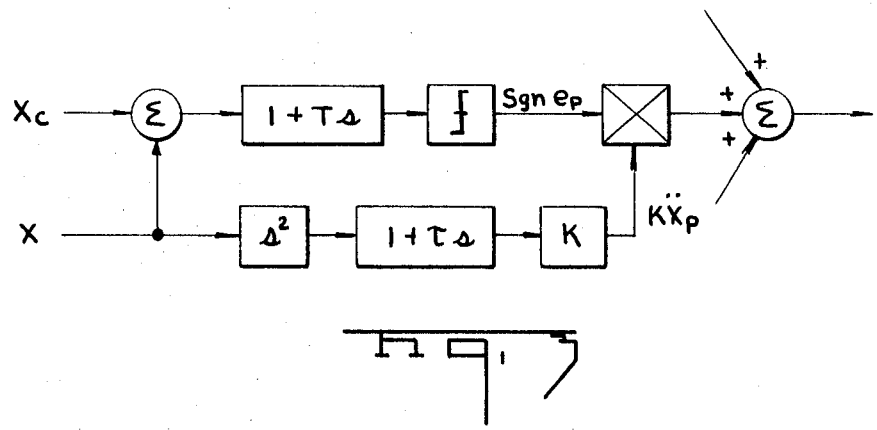
FIG. 3 is a block diagram of a typical performance assessment circuit in accordance with the present invention.

Referring now to FIG. 1, there is shown a block diagram of an entire system utilizing the self-organizing controller of the present invention. The system is driven by command inputs $x_1......x_{ck}$ which are fed to a plurality of performance circuits $PC_1......PC_k$, the sum total of performance circuits comprising the performance assessment of the system. It is noted that the number of performance circuits is equal to the number of command inputs. The self-organizing controller also includes constraint circuits $CC_1......CC_e$, the number of constraint circuits generally being equal to the number of actuators being controlled at the plant. The outputs of the performance circuits and the constraint circuits are summed in a manner to be explained in detail hereinbelow to provide a single value signal to drive the actuation-correlation logic $ACL_1......ACL_l$. The ACL circuits provide actuator excitation signals $U_1......U_l$ to control actuators at the plant. The actuator excitation signals also control the constraint circuits $CC_1......CC_l$. The plant, through sensors, which may be located at the plant or remotely therefrom, provides measured response variables $x_1......x_k$ which are fed back to the performance circuits $PC_1......PC_k$ wherein they are summed on an individual paired basis with the command inputs as will be explained in detail hereinbelow.

Referring now to FIG. 2, there is shown a block diagram of the self-organizing controller itself in accordance with the present invention. The system includes a plurality of performance circuits $PC_1......PC_k$, each performance circuit being driven by a single command input $x_c$ and a single measured response variable $x_1$, the numbered subscripts of the command input and the measured response variable corresponding to the subscript of the performance circuit. The output of each performance circuit is fed to a single summing circuit to provide a single error performance term at the output thereof. This error performance term is fed to a second summing circuit.

The constraint circuits $CC_1......CC_l$ are driven by the actuator excitation signals $U_1......U_l$, each of the actuator excitation signals driving the constraint circuit with corresponding subscript. The outputs of all the constraint circuits are summed to provide a single constraint term, this constraint term being fed to the summing circuit to which the error performance terms were fed and being subtracted therefrom. The output of this summation circuit is a value signal $v$ which is passed through a signum or zero-crossing detector and provides the sgn $v$ signal to control the actuation control logic circuits $ACL_1......ACL_l$. The actuation-correlation logic circuits are known in the art and are discussed in the above-mentioned *Control Engineering* article as well as in many other prior art publications. The outputs of the actuation-correlation logic circuits are fed to corresponding summation circuits to provide the actuator excitation signals. It is noted that each actuation-correlation logic circuit can provide the single actuator signal corresponding with the subscript thereof or, alternatively, the actuation-correlation logic circuits can feed the plurality of summation circuits as shown in FIG. 2. It is apparent that the summing circuits at the output of the performance circuits and the output of the constraint circuits and the summing circuit fed by these two summing circuits could all be combined as a single summation circuit and provide the same intended function.

Referring now to FIG. 3, there is shown a typical performance circuit in accordance with the present invention. The performance circuits shown, could, for example, be the circuit set forth in the block $PC_1$ of FIG. 2. In that event, the input thereto would be $x_{c1}$ and $x_1$, the two inputs being fed to a summation circuit wherein the $x_1$ signal is subtracted from the $x_c$ signal and provides an output to a predictor circuit which performs the Laplace function $1+\tau_1 s$ or other suitable prediction function thereon to provide a predictor output signal. The sign of the predictor output signal is detected, wherein the sign of the predicted error signal is provided. This signal is fed to a multiplier in conjunction with a second signal which is provided by taking the second time derivative of the $x_1$ signal and operating on this signal by the Laplace function $1+\tau_1 s$ or other suitable prediction function thereon and then multiplying this signal by a predetermined constant to provide the second signal to the multiplier circuit. It can be seen that the output of the multiplier is fed to the first summation circuit along with the outputs from the multipliers of all the other performance circuits.

Figure 4:
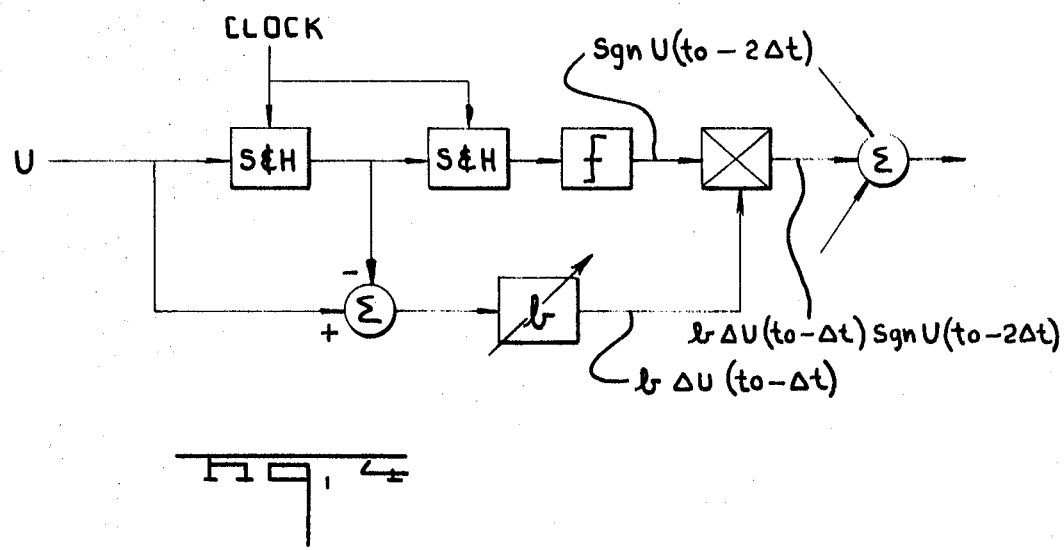
FIG. 4 is a block diagram of a typical constraint circuit in accordance with the present invention.

Referring now to FIG. 4, there is shown a typical constraint circuit such as would be found in the block $CC_1$ of FIG. 2. The constraint circuit utilizes the output $U_1$, for example, and feeds this to a first analog sample-and-hold circuit which is controlled by a clock. It should be noted that the clock controlling the sample-and-hold circuit could be the same one located in the actuation-correlation logic bearing subscript corresponding to that of the constraint circuit.

Whenever a clock pulse is received, the input to the first sample-and-hold circuit is fed to the output thereof, the output of the first sample-and-hold circuit being fed to a summation circuit where it is subtracted from the U signal then provided at the output of the actuation-correlation logic. This delta U signal is then multiplied by a constant term $b_1$ which is selected to determine the amount of constraint desired, and the product is fed to a multiplier wherein it is multiplied with the signum $U_1(t_n 2\Delta t)$ signal which is obtained by utilizing a second clock pulse at time delta $t$ after the first clock pulse which shifts the $U_1$ signal to the output of the second sample-and-hold circuit. The output of the second sample-and-hold circuit is detected for sign in the signum detector to provide the sgn $U_1(t_n 2\Delta t)$ signal. It can be seen that the outputs of the multipliers from each of the constraint circuits are then summed in the summer circuit and fed to the second summer circuit shown in FIG. 2 to provide the output value signal.

By utilization of the above-described circuit, constraints can be placed upon the actuator controls and the variations to take place therein due to system error. In this way, maximum energy utilization or the like as explained hereinabove can be provided automatically by the control system.

Though the invention has been described with respect to a preferred embodiment thereof, many variations and modifications thereof will immediately become apparent to those skilled in the art. It is therefore the intention that the appended claims be interpreted as broadly as possible in view of the prior art to include all such variations and modifications.

What I claim is:

1. A constrained performance assessment device which comprises means responsive to a command input and a measured response input to provide an error performance output, means responsive to an actuator excitation signal to provide a constraint output means for combining said outputs to provide a value signal and means responsive to said value signal to provide said actuator excitation signal.

2. A constrained performance assessment device as set forth in claim 1 wherein said means for combining subtracts said constraint output from said error performance output.

3. A constrained performance assessment device as set forth in claim 1 wherein said means responsive to an actuator excitation input includes adjustable means for controlling the value of said constraint output.

4. A constrained performance assessment device as set forth in claim 2 wherein said means responsive to an actuator excitation input includes adjustable means for controlling the value of said constraint output.

5. A constrained performance assessment device as set forth in claim 3 wherein said means responsive to an actuator excitation input performs the function $b\Delta U(t_o-\Delta t)\text{sgn } U(t_o-2\Delta t)$, where $b$ is said adjustable means and is a constant which is preset to provide predetermined constraint, U is the actuator excitation input, $t$ represents time and $t_o$ is an arbitrary starting time.

6. A constrained performance assessment device as set forth in claim 4 wherein said means responsive to an actuator excitation input performs the function $b'\Delta U(t_o-\Delta)\text{sgn } U(t_o-2\Delta t)$, where $b$ is said adjustable means and is a constant which is preset to provide predetermined constraint, U is the actuator excitation input, $t$ represents time and $t_o$ is an arbitrary starting time.

7. A control system for a plant having a plurality of actuators therein, said control system being responsive to command input means and measured plant response input means to provide actuator excitation outputs for controlling said actuators, said control means including means responsive to said command input means and said measured plant response input means to provide an error performance output, means responsive to said actuator excitation outputs for providing a constraint output and means responsive to said error performance output and said constraint output for providing said actuator excitation outputs.

8. A control system as set forth in claim 7 wherein said means responsive to said actuator excitation outputs includes a plurality of constraint circuits, each said actuator excitation output being coupled to an associated constraint circuit, said constraint circuits each providing constraint signals in response to said actuator excitation outputs and means for adding said constraint signals to provide said constraint output.

9. A control system as set forth in claim 8 wherein said means responsive to said command input and said measured plant response input includes a plurality of performance circuits, each performance circuit being responsive to an associated command input signal and an associated measured plant response input to provide an error signal, and means for adding said error signals for providing said error performance output.

10. A control system as set forth in claim 9, further including means for subtracting said constraint output from said error performance output for providing a value signal and means responsive to said value signal for providing said actuator excitation outputs.

11. A control system as set forth in claim 8, wherein each said constraint circuit includes adjustable means for controlling the value of said constraint signals.

12. A control system as set forth in claim 10, wherein each said constraint circuit includes adjustable means for controlling the value of said constraint signals.

13. A control system as set forth in claim 8, wherein each said constraint circuit performs the function $b\Delta U(t_o-\Delta t)\text{sgn } U$ (to t) sgn U $U(t_o-2\Delta t)$, where $b$ is an associated constant which is preset to provide predetermined constraint, U is the associated actuator excitation signal, $t$ represents time and $t_o$ is an arbitrary starting time.

14. A control system as set forth in claim 10, wherein each said constraint circuit performs the function $b\Delta U(t_o-\Delta t)\text{sgn } U(t_o-2\Delta t)$, where $b$ is an associated constant which is preset to provide predetermined constraint, U is the associated actuator excitation signal, $t$ represents time and $t_o$ is an arbitrary starting time.